United States Patent [19]
Okamoto et al.

[11] Patent Number: 5,815,331
[45] Date of Patent: *Sep. 29, 1998

[54] DIGITAL SIGNAL RECORDING METHOD AND APPARATUS INVOLVING PRECODE PROCESSING FOR PARTIAL RESPONSE DETECTION

[75] Inventors: Hiroo Okamoto; Kyoichi Hosokawa; Hitoaki Owashi; Takaharu Noguchi, all of Yokohama, Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 620,687

[22] Filed: Mar. 21, 1996

[30] Foreign Application Priority Data

Mar. 28, 1995 [JP] Japan .................................. 7-069141

[51] Int. Cl.⁶ ...................................................... G11B 5/09
[52] U.S. Cl. ................................................ 360/48; 360/27
[58] Field of Search ................................ 360/27, 48, 39, 360/32; 380/12, 15, 17, 9, 48; 341/59; 386/109, 112

[56] References Cited

U.S. PATENT DOCUMENTS

| | | | |
|---|---|---|---|
| 4,677,421 | 6/1987 | Taniyama | 360/39 X |
| 4,680,791 | 7/1987 | Kato et al. | 380/8 |
| 4,885,646 | 12/1989 | Kanota et al. | 360/46 |
| 5,396,374 | 3/1995 | Kubota et al. | 360/27 |

FOREIGN PATENT DOCUMENTS

| | | |
|---|---|---|
| 0343930 | 11/1989 | European Pat. Off. . |
| 0388031 | 9/1990 | European Pat. Off. . |
| 0686968 | 12/1995 | European Pat. Off. . |
| 60-256984 | 12/1985 | Japan . |
| 2-252334 | 10/1990 | Japan . |
| A-4-216305 | 8/1992 | Japan . |

OTHER PUBLICATIONS

U.S. Serial No. 08/547622 filed on Oct. 24, 1995 entitled "Input–Output Circuit, Recording Apparatus and Reproduction Apparatus for Digital Video Signal".
"Modulation and Coding for Information Storage", Paul H. Siegel et al., IEEE Communication Magazine, Dec. 1991, pp. 68–86.
U.S. Serial No. 08/518759 filed on Aug. 15, 1995.

*Primary Examiner*—Andrew L. Sniezek
*Assistant Examiner*—Patrick Wamsley
*Attorney, Agent, or Firm*—Antonelli, Terry, Stout & Kraus, LLP

[57] ABSTRACT

A digital signal recording method and apparatus for recording a digital signal on a recording medium by dividing the digital signal at intervals of a certain byte number, adding to each of the divided signals a synchronizing signal, a control signal including block address information, and an error detection and correction code to form signal blocks, and precoding each of the signal blocks in order to detect a partial response. Before the precode processing, the digital signal and the error detection and correction code are scrambled on the basis of the control signal, and the control signal is inverted.

3 Claims, 5 Drawing Sheets

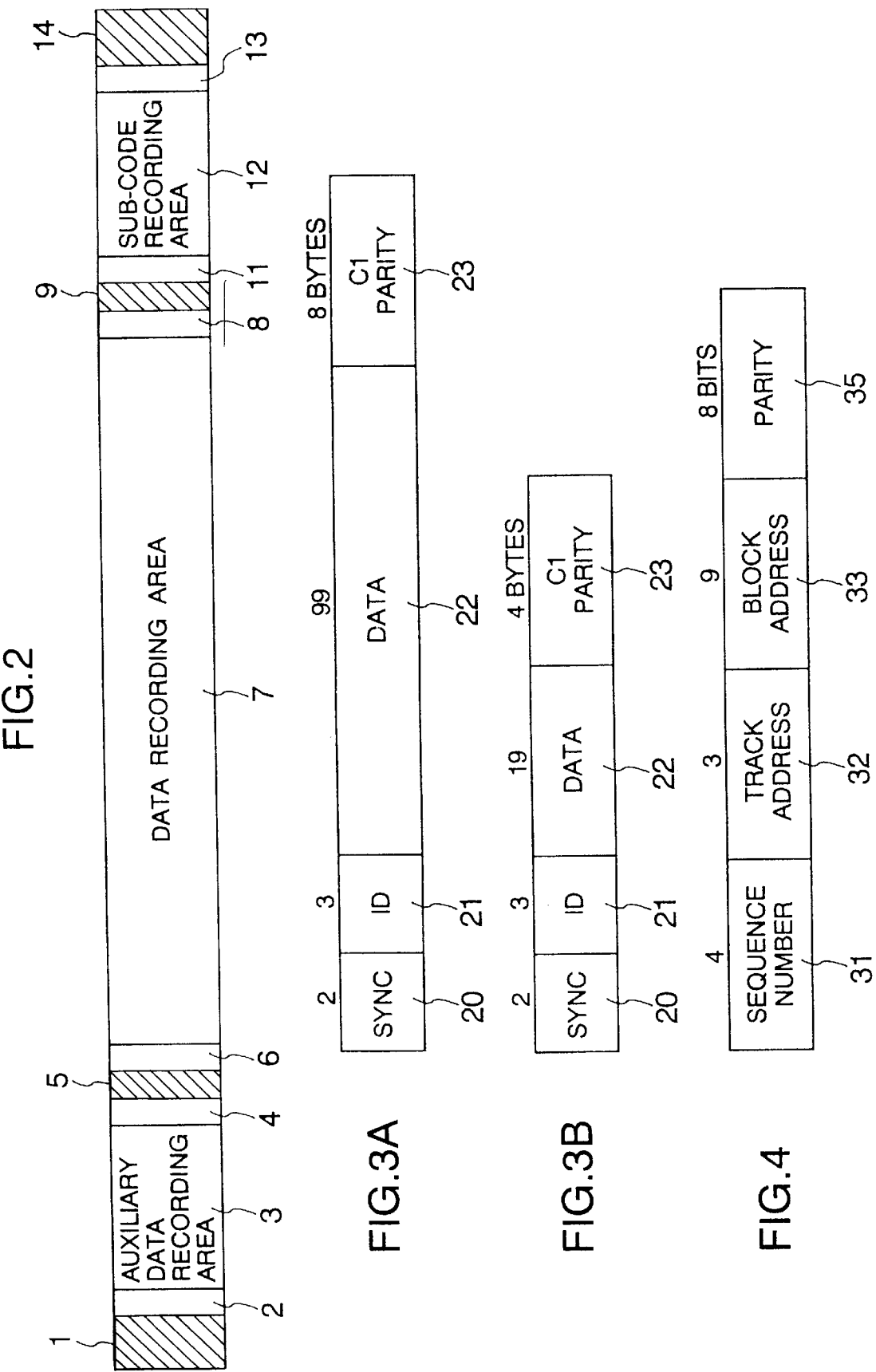

DIGITAL SIGNAL RECORDING METHOD AND APPARATUS INVOLVING PRECODE PROCESSING FOR PARTIAL RESPONSE DETECTION

CROSS-REFERENCE TO RELATED APPLICATION

This application relates to U.S. application Ser. No. 08/547,622, now abandoned, filed on Oct. 24, 1995 and entitled "INPUT-OUTPUT CIRCUIT, RECORDING APPARATUS AND REPRODUCTION APPARATUS FOR DIGITAL VIDEO SIGNAL", claiming priority based on Japanese Patent Application Nos. 6-264874 and 7-140294. This application further relates to U.S. application Ser. No. 08/518579 filed on Aug. 15, 1995 and entitled "METHOD AND APPARATUS FOR RECORDING DIGITAL SIGNAL", claiming priority based on Japanese Patent Application Nos. 6-201751, 6-201752 and 6-264871. The disclosures of those U.S. applications are hereby incorporated by reference.

BACKGROUND OF THE INVENTION

The present invention relates to a digital signal recording apparatus and a method for recording digital signals, and particularly to a recording method and an apparatus for recording a digital signal after precode processing for partial response detection.

One example of digital signal recording apparatus for recording a digital signal on a magnetic tape after scramble processing and then precode processing for partial response detection is described in JP-A-4-216305 and in "Modulation and Coding for Information Storage" by Paul H. Siegel et al., IEEE Communication Magazine, December 1991, pp. 68–86.

SUMMARY OF THE INVENTION

In the above prior art, however, since the scramble processing is carried out based on a fixed pattern at each data block, there arises a problem that a fixed pattern will repeat each data block even after the scramble processing, when the digital signal has a fixed value, for example, all "0"s. Particularly when a pattern of a long run-length repeatedly occurs, error will increase upon reproduction. This problem may be solved by carrying out different scramble processing at each block on the basis of block address or the like. In this case, however, the block addresses themselves cannot be scrambled, thus easily generating patterns of long run-lengths. The block addresses are signals based on which the blocks can be reproduced. If error is increased in this information, the reliability in reproduction is greatly reduced.

Accordingly, it is an object of the invention to provide a digital signal recording method and apparatus in which patterns of long run-length are less produced after precode processing.

According to one aspect of the invention, to achieve the above object, there is provided a digital signal recording apparatus for recording a digital signal on a recording medium after the digital signal is divided into blocks of a certain number of bytes each, added for each block with a synchronizing signal, a control signal including block address information, and an error detection and correction code, and subjected to precode processing for partial response detection, wherein before the precode processing the digital signal and the error detection and correction code are subjected to a scramble processing on the basis of the control signal, and the control signal is inverted.

Since the digital signal and error detection and correction code are scrambled on the basis of the control signal, a fixed pattern can be prevented from being repeated at each data block. Further, since the control signal is precoded after inversion, it is hardly possible that a pattern of long run-length will occur after precode processing.

BRIEF DESCRIPTION OF THE DRAWINGS

FIG. 2 shows the recording format of one track.

FIGS. 3A and 3B show the formats of blocks in different areas.

FIG. 4 shows the format of ID information 21.

DESCRIPTION OF THE PREFERRED EMBODIMENTS

One embodiment of the present invention will be described with reference to the accompanying drawings.

Figure 1:
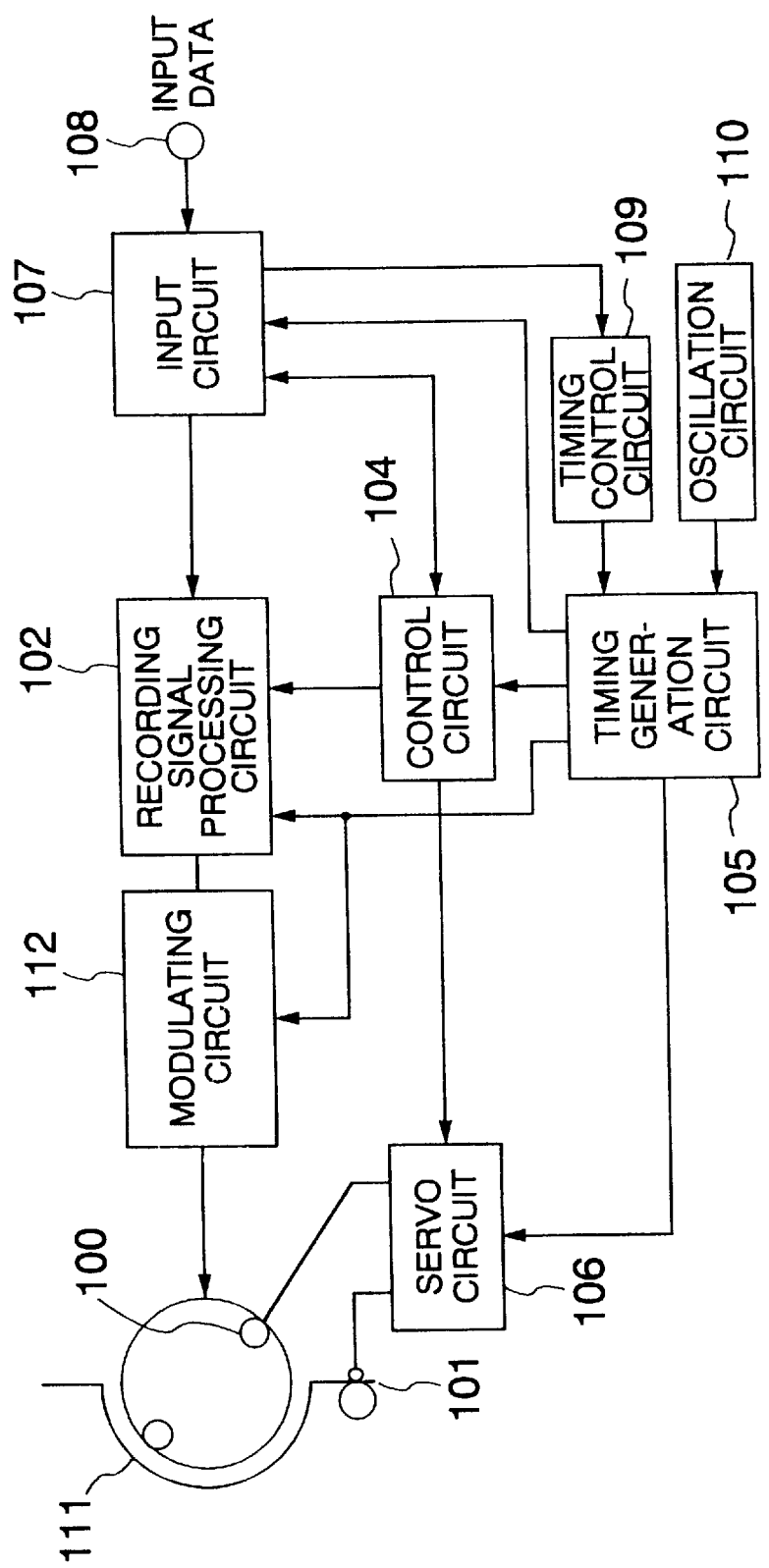
FIG. 1 is a block diagram of a digital signal recording apparatus of one embodiment of the invention.

FIG. 1 is a block diagram of a digital signal recording apparatus of one embodiment of the invention. Referring to FIG. 1, there are shown rotating heads 100, a capstan 101, a recording signal processing circuit 102 for generating a recording signal upon recording, a control circuit 104 for controlling recording modes or the like, such as a microprocessor, a timing generation circuit 105 for generating timing signals which control the operation of the rotating heads 100 and other operations, a servo circuit 106 for controlling the head rotation and the tape transport speed, an input circuit 107 for receiving the signal being recorded, a timing control circuit 109 for controlling the recording timing, an oscillation circuit 110 for generating a reference clock, a tape 111 and a modulating circuit 112 for the recording signal.

Recording data in a packet format is fed to the input circuit 107 through an input/output terminal 108 at arbitrary intervals of time. A part of the packet data fed from the input/output terminal 108 is supplied through the input circuit 107 to the control circuit 104. The control circuit 104 detects the kind of the packet data, the maximum transmission rate and so on from the information added to the packet data or other information separately fed, decides a recording mode from the detected results, and fixes the modes in which the recording signal processing circuit 102 and servo circuit 106 are to be operated. The input circuit 107 detects the packet data to be recorded, and supplies it to the recording signal processing circuit 102. The recording signal processing circuit 102 decides the number of packets to be recorded on each track according to the recording mode decided by the control circuit 104, generates an error detection and correction code and so on, and generates the recording signal. The modulating circuit 112 modulates the recording signal, and the modulated signal is then recorded on the tape 111 by the rotating heads 100.

FIG. 2 shows the format, or recording pattern, of the signal recorded on each track. The one-track pattern includes an auxiliary data recording area 3 for an audio signal and so on, a data recording area 7 for a digital compressed video signal, a sub-code recording area 12 for a sub-code such as time information and program information, preambles 2, 6 and 11 to those recording areas, postambles 4, 8 and 13 after those recording areas, gaps 5 and 9 between those recording areas, and margins 1 and 14 at the opposite ends of the track. The preambles, postambles and gaps provided before, after and between those recording areas make it possible to separately perform post-recording (or after-recording) on the respective areas. Of course, other digital signals than the digital compressed video signal and audio signal may be recorded on the recording areas 3 and 7. In addition, the digital compressed video signal and digital compressed audio signal may be recorded together on the areas 7.

FIGS. 3A and 3B show the block formats of those areas. FIG. 3A shows the block format of the auxiliary data recording area 3 and data recording area 7. In FIG. 3A, this block includes a synchronizing signal 20, ID information 21, data 22 and a parity (C1 parity) for the first error detection and correction. For example, the synchronizing signal 20, ID information 21, data 22, and parity 23 have 2 bytes, 3 bytes, 99 bytes and 8 bytes, respectively, to form one block of 112 bytes. FIG. 3B shows the block format of the sub-code recording area 12. This block includes the synchronizing signal 20 of 2 bytes, ID information of 3 bytes same as in FIG. 3A, data 22 of 19 bytes, and parity 23 of 4 bytes. Thus, one block corresponds to ¼ the block length in FIG. 3A, or to 28 bytes. Thus, since the ratio of the byte number of one block to the other becomes an integer, and since the structures of the synchronizing signal 20 and ID information 21 are the same throughout all the areas, respectively, the block generation and the detection of the synchronizing signal and ID information at the time of recording can be performed by the same circuit.

FIG. 4 shows the format of the ID information 21. This ID information includes a sequence number 31, a track address 32, a block address 33 within each track, and a parity 35 for the detection of error in the sequence number 31, track address 32 and block address 33. The block address 33 is used for discriminating the blocks in each recording area. For example, it can be changed from 0 to 335 in the data recording area 7, from 0 to 13 in the auxiliary data recording area 3, and from 0 to 15 in the sub-code recording area 12. The track address 32 is used for discriminating the tracks. For example, it can be changed one from 0 to 5 for each track or from 0 to 2 for every two tracks, or totally 6 tracks can be discriminated by this track address. The sequence number 31 is changed from 0 to 11 for every six tracks discriminated by the track address 32, or totally 72 tracks can be discriminated by the sequence number 31. If the track address is synchronized with the period of the second error correction code which will be described later, the processing upon recording and the discrimination upon reproduction can be easily performed.

Figure 5:
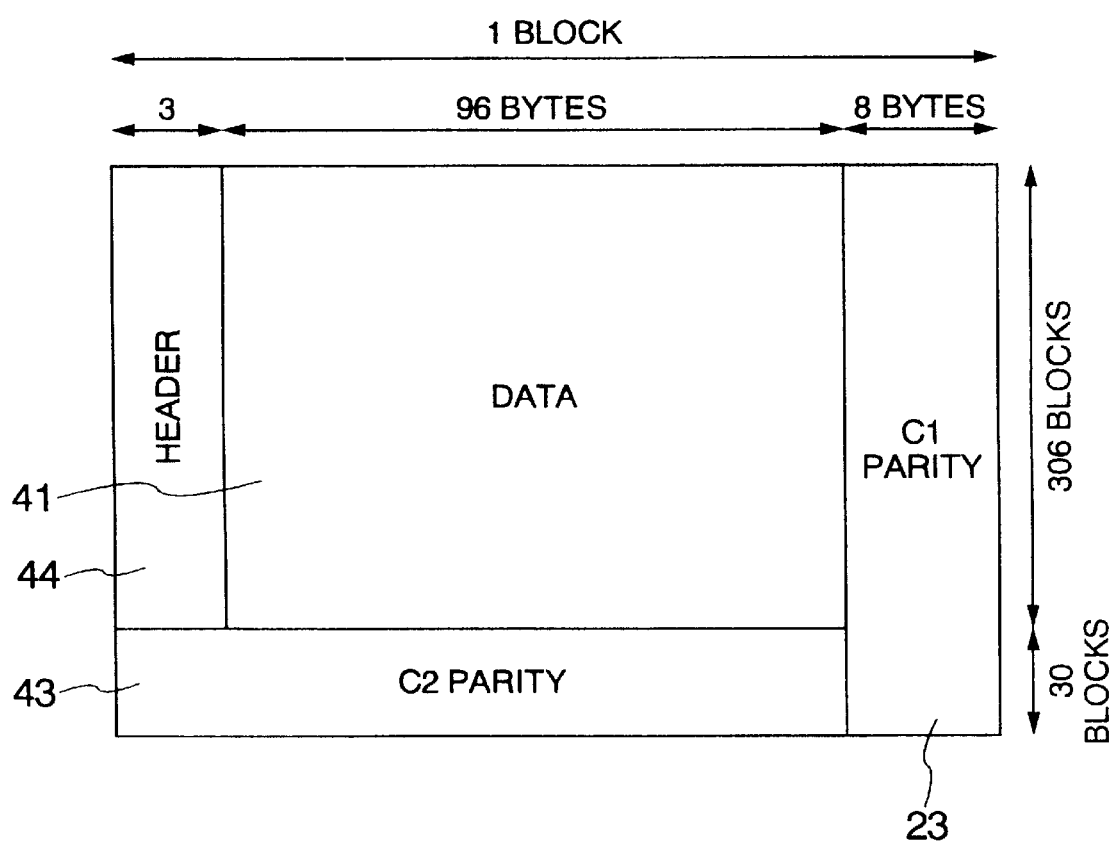
FIG. 5 shows the format of data on one track in a data recording area 7.

FIG. 5 shows the format of data of each block in the data recording area 7. In FIG. 5, the synchronizing signal 20 and the ID information 21 are not shown. The data recording area 7 is formed of, for example, 336 blocks. Data 41 is recorded in the first 306 blocks, and the second error correction code (C2 parity) 43 in the other 30 blocks.

The C2 parity 43 is added such that, for example, the C2 parity of 10 blocks is added to each 102 blocks into which data of 306 blocks×6 tracks is divided by 18. The error correction code may be, for example, Reed-Solomon code. Data of 99 bytes of each block is formed of a header 44 of 3 bytes and data 41 of 96 bytes.

Figure 6:
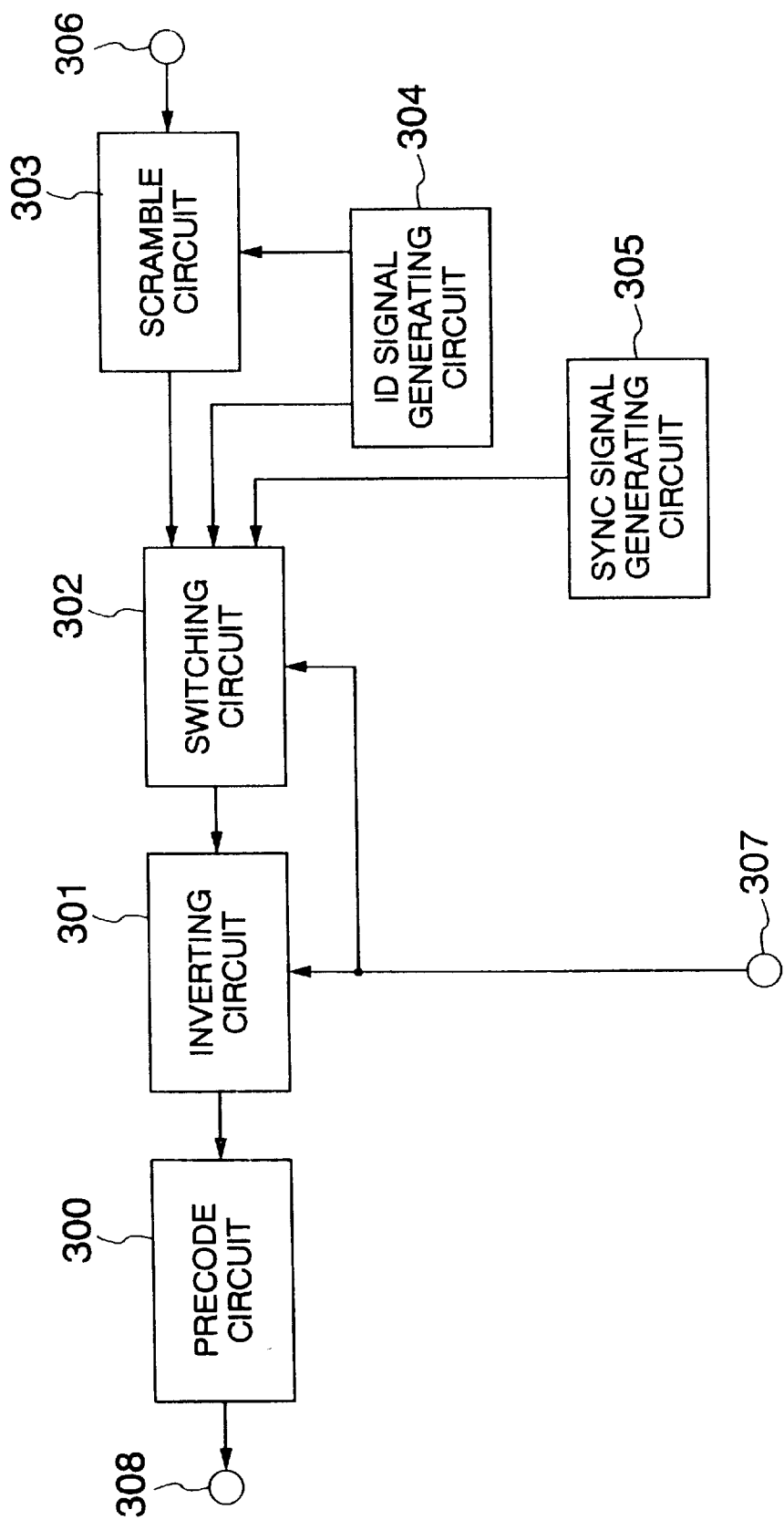
FIG. 6 is a block diagram of a modulating circuit 112.

FIG. 6 is a block diagram of the modulating circuit 112. Referring to FIG. 6, there are shown a precode circuit 300, an inverting circuit 301, a switching circuit 302, a scramble circuit 303, an ID signal 21 generating circuit 304, and a generating circuit 305 for generating a synchronizing signal 20. The data 22 and C1 parity 23 fed through an input terminal 306 are supplied to and scrambled by the scramble circuit 303 and then fed to the switching circuit 302. The switching circuit 302 is responsive to a predetermined timing signal that is generated from the timing generation circuit 105 and fed through an input terminal 307 to switch among the output from the scramble circuit 303, the ID signal generated from the ID signal generation circuit 304 and the synchronizing signal generated from the synchronizing signal generation circuit 305, and as a result produces the block signal shown in FIGS. 3A and 3B. This block signal is processed by the precode circuit 300 after its ID signal is inverted by the inverting circuit 301. The precoded signal is then fed through an output terminal 308 to the rotating heads 100 by which it is recorded on the tape.

Figure 7:
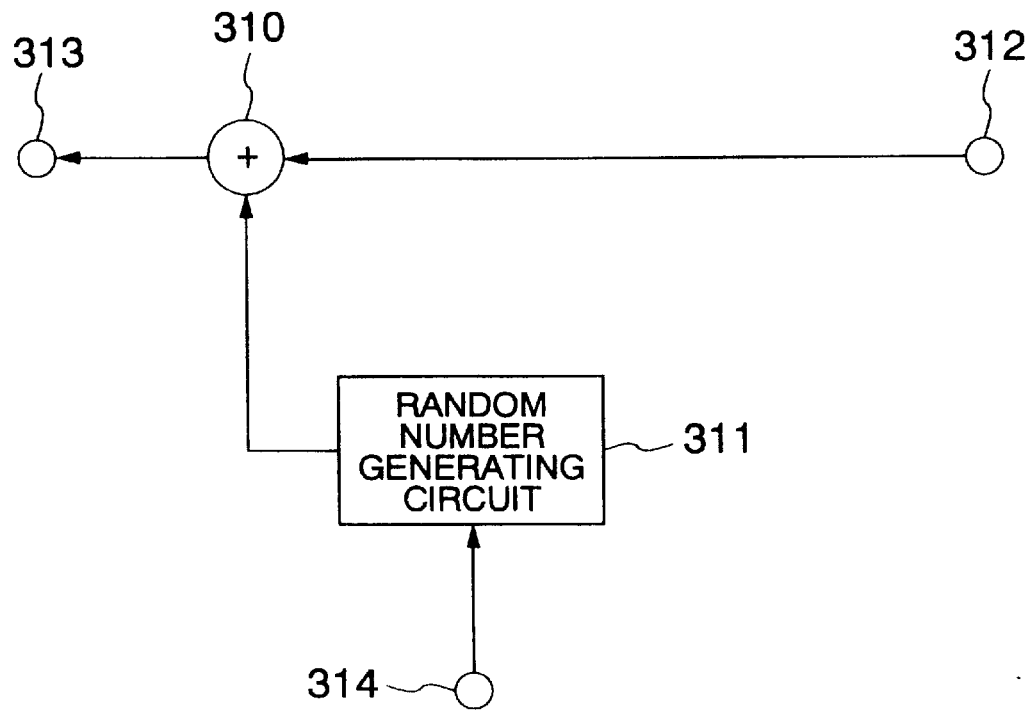
FIG. 7 is a block diagram of a scramble circuit 303.

FIG. 7 is a block diagram of the scramble circuit 303. This circuit arrangement includes an exclusive logic sum (OR) circuit 310 and a random number generation circuit 311 for generating, for example, a Maximum length sequence code, an input terminal 312 for receiving input data, an output terminal 313, and an input terminal 314. The block address 33 and track address 32 generated from the ID signal generating circuit 304 and received by the terminal 314 are fed to the random number generating circuit 311 as initial values. The generated random number from the generator is added to the data 22 and C1 parity 23. Thus, even when the digital signal is fixed, for example, all "0"s, a fixed pattern can be prevented from repeating at each block unit.

Figure 8:
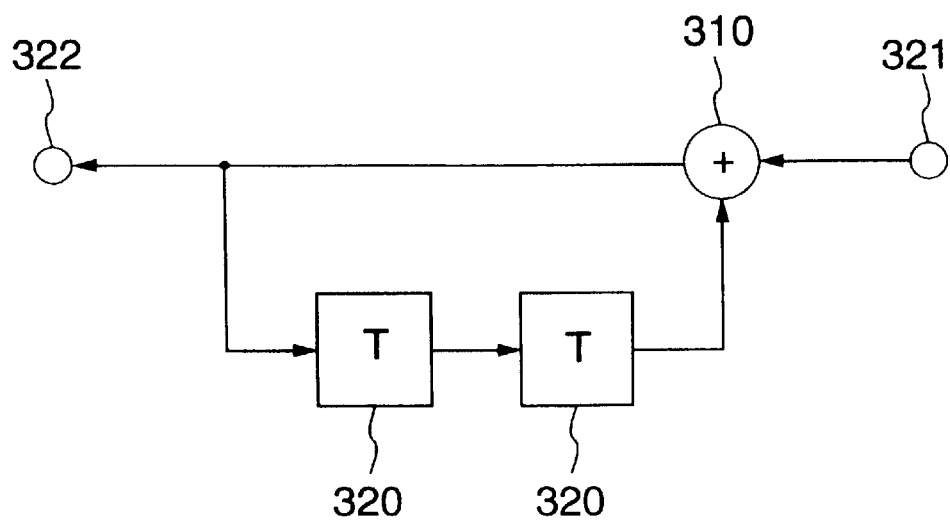
FIG. 8 is a block diagram of a precode circuit 300.

FIG. 8 is a block diagram of the precode circuit 300. This circuit arrangement includes one-bit delay circuits 320 and the exclusive logic sum circuit 310. The input data fed through an input terminal 321 and a signal delayed two bits relative to the input data are exclusive-ORed to produce a precoded signal. Thus, when the values from the delay circuits 320 are both 0 while the input data is a succession of "0"s, the output at an output terminal 322 is also a succession of "0"s. If the input data contains "1", the output is sure to be inverted. If the input data is a succession of "1"s, the output becomes a repetition of 1100.

The ID signal 21 is not scrambled. Therefore, the head of the sequence is always "0". When the parity 35 is a simple parity, "0" continuously appears over 24 bits. Even when the parity 35 is a special one, "0" continuously appears over 16 bits. In addition, even when the sequence number 31 is not "0", the track address 32 and block address 33 periodically take "0". On the other hand, as described previously, if the sequence number 31, track address 32 and block address 33 are not fully used, it does not occur that all bits take "1". Therefore, when the ID signal is directly precoded, it is likely that a run-length of 24 bits maximum is caused in the recording signal depending on the values of delay circuits 320. However, if the precode processing is made after the inversion of the ID signal, such a long run-length does not occur. Of course, the other scrambled signal than the ID signal may be similarly precoded and recorded after being inverted.

According to this invention, since the non-scrambled information is precoded after inversion, it is possible to reduce the possibility of a long run-length pattern occurring in the recording signal.

We claim:

1. A digital signal recording method for recording an input digital signal on a recording medium after precoding said digital signal comprising the steps of:

dividing said input digital signal at a certain byte number, and adding to each of said divided signals an error detection and correction code to form a succession of signal blocks;

generating a synchronization signal and a control signal including block address information for each signal block;

scrambling the digital signal and error detection and correction code of each signal block on the basis of said block address information;

adding said synchronization signal and said control signal including said block address information to each scrambled signal block;

inverting at least said control signal of each of said signal blocks;

precoding said scrambled digital signal and error detection and correction code, the synchronization signal, and the control signal from said inverting step; and recording each of precoded signals from said precoding step, on said recording medium.

2. A digital signal recording apparatus for recording an input digital signal on a recording medium after precoding said digital signal comprising:

a recording signal processing circuit for dividing said input digital signal a certain byte number, and adding to each of said divided signals an error detection and correction code to form a succession of signal blocks;

a circuit for generating a synchronization signal and a control signal containing block address information;

a scramble circuit for scrambling the digital signal and error detection and correction code of each of said signal blocks on the basis of said block address information;

a circuit for adding said synchronization signal and said control signal containing said block address information to each scrambled signal block;

an inverting circuit for inverting at least the control signal of each of said signal blocks;

a precode circuit for precoding said scrambled digital signal and error detection and correction code, said synchronization signal and said control signal after the inverting of said inverting circuit; and a head arrangement for recording each of said precoded signals from said precode circuit on said recording medium.

3. A digital signal recording apparatus for recording an input digital signal on a recording medium after precoding said digital signal comprising:

means for dividing said input digital signal at a certain byte number, and adding to each of said divided signals an error detection and correction code to form a succession of signal blocks;

means for generating a synchronization signal and an ID signal containing block address information;

means for scrambling the digital signal and error detection and correction code of each of said signal blocks on the basis of said block address information;

means for adding said synchronization signal and said ID signal to each scrambled signal block;

means for inverting at least the ID signal of each of said signal blocks;

means for precoding said scrambled digital signal and error detection and correction code, said synchronization signal and said ID signal after the inverting of said means for inverting; and means for recording each of said precoded signals on said recording medium.

* * * * *